United States Patent [19]

Lehman

[11] 4,199,896
[45] Apr. 29, 1980

[54] CONTROLLED AREA BOOM SPRAYER

[76] Inventor: Verne E. Lehman, 2917 Sycamore La., Donnybrook, Bremen, Ind. 46506

[21] Appl. No.: 918,161

[22] Filed: Jun. 22, 1978

[51] Int. Cl.$^2$ ............................................. A01C 23/04
[52] U.S. Cl. ........................................ 47/1.7; 118/305; 118/684; 134/46; 134/52; 134/180; 239/165; 239/176; 239/288.5
[58] Field of Search ................... 239/288, 288.3, 288.5, 239/166, 167, 165, 169, 175, 176; 47/1.7; 134/44, 46, 52, 172, 180, 198; 118/3, 305, 323, 684, 710

[56] References Cited

U.S. PATENT DOCUMENTS

| | | | |
|---|---|---|---|
| 2,424,202 | 7/1947 | Woolery | 118/305 |
| 2,928,610 | 3/1960 | Fenimore | 239/288.5 |
| 3,109,592 | 11/1963 | Harris | 239/165 |
| 3,267,610 | 8/1966 | Hills | 47/1.7 |

FOREIGN PATENT DOCUMENTS 184058 9/1966 U.S.S.R. ..................... 47/1.7

Primary Examiner—Johnny D. Cherry
Assistant Examiner—Michael J. Forman
Attorney, Agent, or Firm—Woodard, Weikart, Emhardt & Naughton

[57] ABSTRACT

Disclosed is a boom sprayer assembly for applying herbicides, or the like, in a controlled pattern about a row of trees, bushes, etc. A boom arm of changing length and angular position carries a bell-shaped sprayer hood which is free to rotate independently of the spray nozzle it encloses. The hood acts as a position sensing element to guide the boom so that the desired spray pattern is put down around the row of trees or bushes without permitting the spray to reach the foliage of the bushes or tree trunks.

2 Claims, 6 Drawing Figures

CONTROLLED AREA BOOM SPRAYER

BACKGROUND OF THE INVENTION

In the use of herbicides, fertilizers or other sprayable materials, it is very important to control the spray pattern. Accurate pattern control becomes particularly important in the application of now widely used, non-selective herbicides. Where, for economical weed control, non-selective herbicides are to be deposited on target areas such as the ground surface beneath rows of orchard trees or to the ground along rows of fruit-bearing bushes, the herbicide must not be allowed to reach the trunk area of the trees or the foliage of the bushes.

Use of a bell-shaped hood to confine the spray is shown in U.S. Pat. No. 2,928,610, however the hood is fixed to the spray nozzle and cannot rotate relative to the nozzle. Various types of shielded-spray, tractor-drawn devices are disclosed in U.S. Pat. Nos. 2,682,132; 3,038,665; 3,807,634 and 3,977,605. Of this group U.S. Pat. No. 2,682,132 discloses a photo-electric sensing device for locating the non-targeted area and the spray nozzle is guided or positioned accordingly.

The apparatus of the present invention provides a freely rotatable hood for the spray element which acts as a sensing element to determine the motion of the spray nozzle carrying boom. This action is carried out by simple, trouble-free mechanical means rather than the more complicated photo-electric means of U.S. Pat. No. 2,682,132.

DESCRIPTION OF THE PREFERRED EMBODIMENTS

Figure 1:
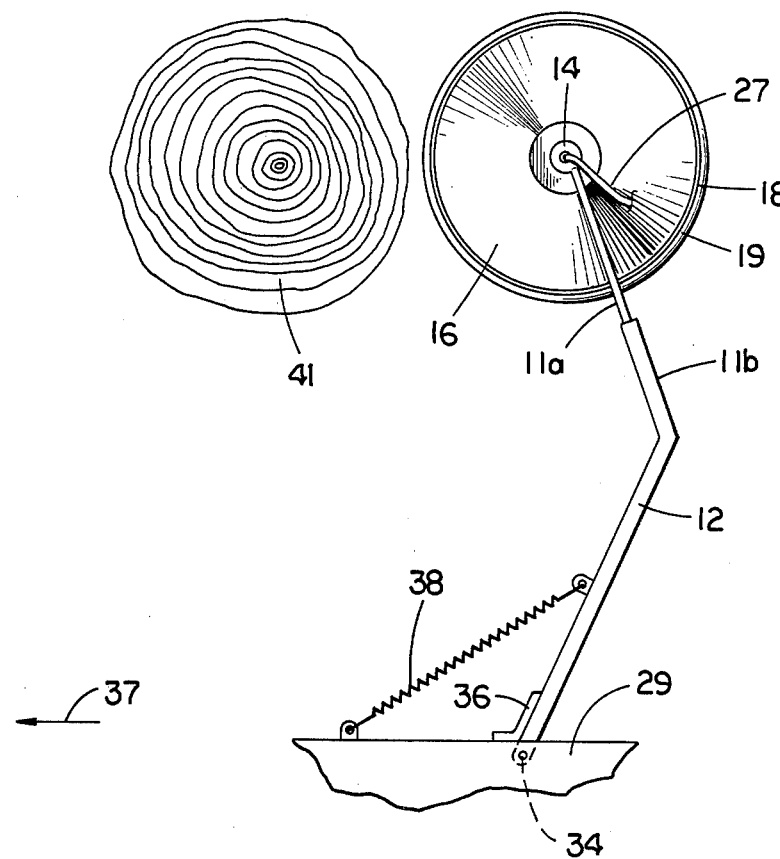
FIG. 1 is a top plan view of the structure of the present invention.
Figure 2:
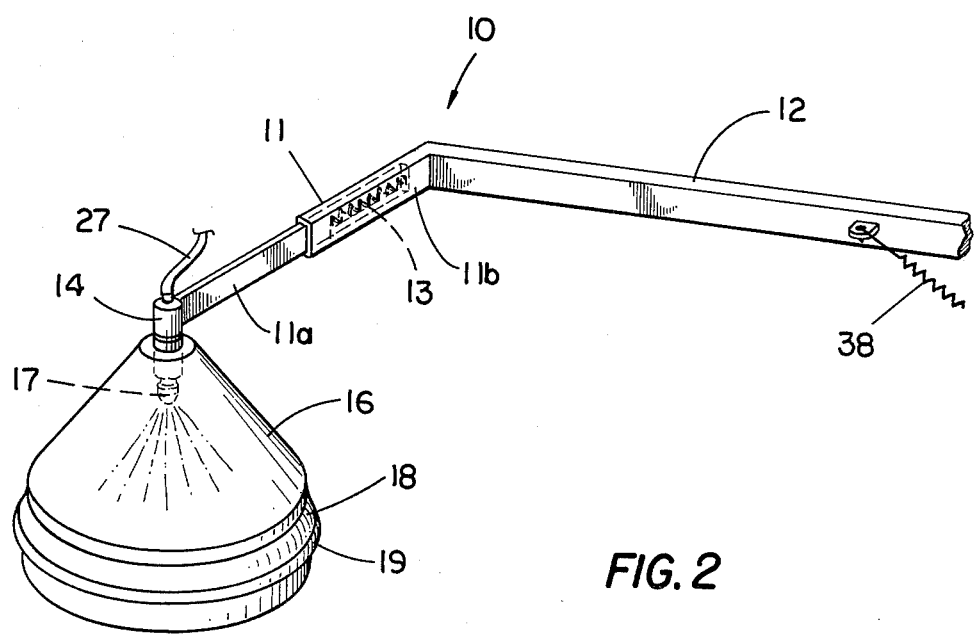
FIG. 2 is a perspective view of the structure shown in FIG. 1.

Referring initially to FIGS. 1 and 2, the spraying apparatus of the present invention may be seen to be comprised of a boom 10 composed of sections 11 and 12 which extend at an obtuse angle with relation to each other. The section 11 of the boom is formed by two telescoping portions 11a and 11b, the portion 11a being urged into extended or maximum length position by the compression spring 13.

Carried on the free end of boom portion 11a is a bearing assembly 14 which supports a bell-shaped hood 16 for free rotation with respect to the boom. Extending along the central axis of hood 16 is a spray nozzle 17 adapted to disperse liquid droplets in the pattern shown in broken lines in FIG. 2 within the open lower end, or mouth, of the hood 16. The nozzle 17 is stationary with relation to the boom but the hood 16 is free to rotate around the nozzle.

Figure 3:
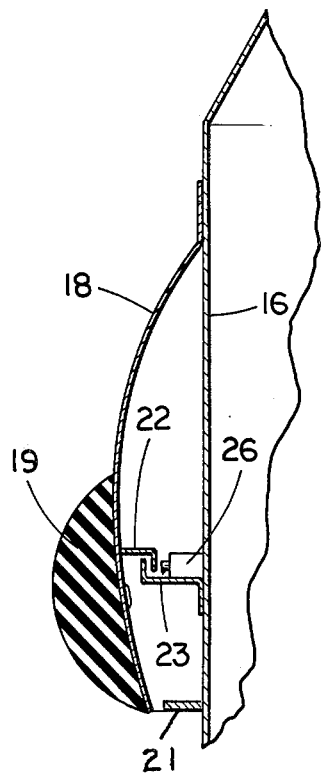
FIG. 3 is an enlarged, fragmentary, side sectional view of FIG. 2.
Figure 6:
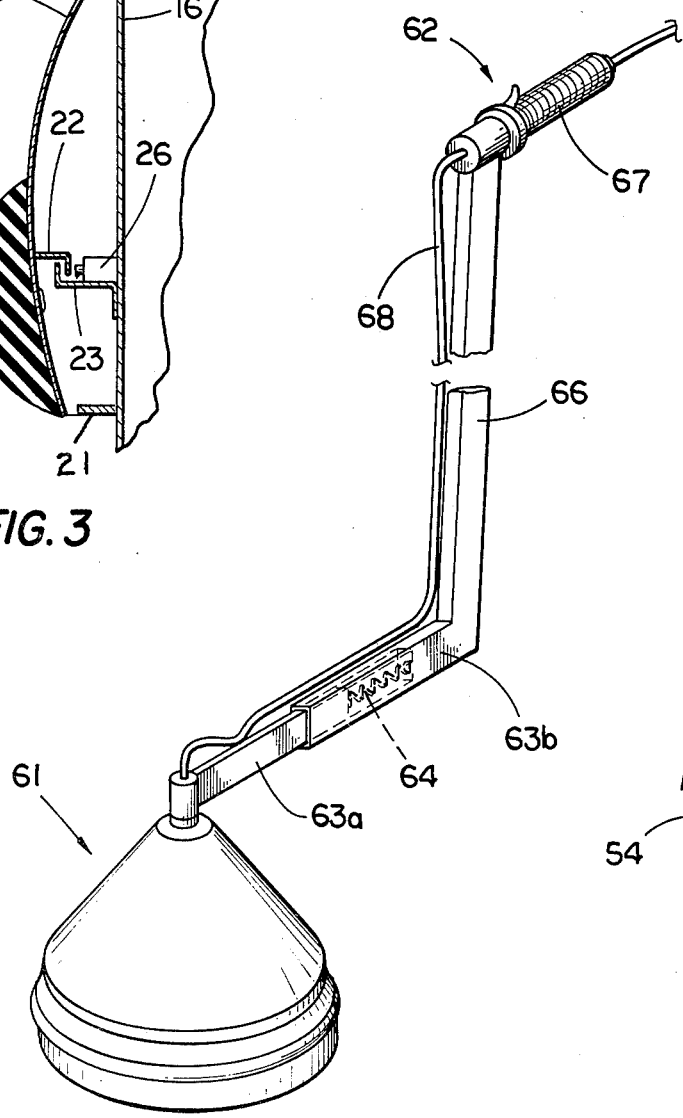
FIG. 6 is a perspective view of a modified form of the apparatus adapted for hand held use.

The lower, marginal area of the hood is provided, as may best be seen in FIG. 3 with an outwardly bowed, spring-steel band 18 to which is secured a resilient member 19 which may be formed of rubber or a similar elastomeric compound. A horizontal, outwardly extending band 21 limits the radially inward flexing of the band 18 when a compressive force is applied to the resilient member 19. The inner surface of the band 18 carries a member 22 having a downwardly extending flange which overlaps the upwardly extending flange of a member 23 carried on the adjacent surface of the hood 16. At spaced points around the circumference of the hood 16, the member 23 supports normally open contact enclosed switches 26 which are actuated to closed position when the adjacent portion of the member 22 engages the thrust pin of the respective switch. This engagement occurs, as will be evident from FIG. 3, whenever a compressive force on resilient member 19 flexes the band 18 inwardly. Excessive outward movement of band 18, as might occur when the diametrically opposite portion of the band is flexed inwardly, is prevented by engagement of the peripheral flanges on members 22 and 23 with each other. A flexible tube or hose shown fragmentarily at 27 conducts the liquid to be sprayed to the nozzle 17.

Figure 5:
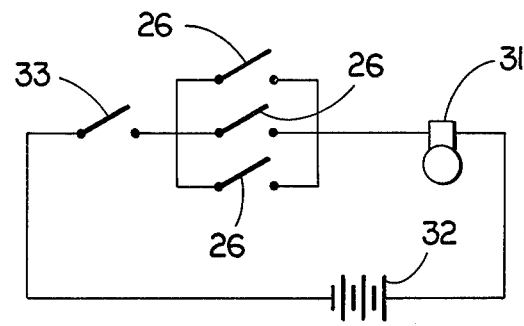
FIG. 5 is a schematic showing of an electrical circuit for the valve controlling flow to the spray nozzle.

The liquid supply tank and pump (not shown) are conventionally carried on a mobile platform, shown fragmentarily at 29 in FIG. 1, which may take the form of a tractor drawn sprayer trailer. The liquid delivery system may include a solenoid valve 31 (FIG. 5) controlling liquid flow to tube 27, the circuit from the power source 32 being through a main, on-off switch 33 and the parallel connected, boom mounted switches 26, previously described, as will be evident from FIG. 5.

Referring again to FIG. 1, the boom is pivotally mounted at 34 to the mobile platform 29. A stop abutment 36 engages the boom and permits it to pivotally move through no larger than an acute angle with the axis of motion (indicated by arrow 37 in FIG. 1) of the platform measured at the trailing margin of the boom. A tension spring 38 urges the boom against the stop but permits clockwise pivotal movement of the boom, as viewed in FIG. 1.

Figure 4:
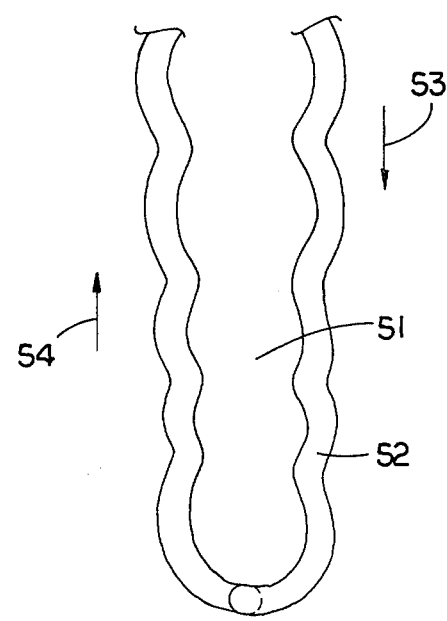
FIG. 4 is a schematic, top plan view of a row of bushes illustrating the area at the margin of the row sprayed by two parallel passes of the structure of FIGS. 1-3.

The operation of the apparatus will now be described with reference to FIGS. 1 and 4. A bush or, alternatively, the trunk of a tree is indicated at 41 in FIG. 1 and, it may be assumed, the bush or tree is one in a row of such extending in the direction of the arrow 37, that is, in the direction of motion of the platform 29. As the platform moves in the direction of arrow 37, the resilient rim 19 of the hood 16 will engage the tree trunk and will then roll on the trunk, the hood 16 freely rotating about its central vertical axis. Upon continued movement of platform 29, as the hood traverses 180° of the trunk circumference, the telescoping boom portions 11a and 11b will cooperate to permit the effective length of the boom to vary as required and the force exerted by tension spring 38 will maintain the proper engaging force on the hood 16 against the tree trunk. During engagement of hood 16 with the tree trunk, the compression of member 19 will close, in over-lapping relation, the switches 26 causing the spray nozzle to deposit, for example, a non-specific herbicide liquid on the ground beneath the tree trunk in a half-annular pattern adjacent approximately one-half the circumference of the tree trunk. When the hood separates from the tree trunk, the flow of liquid will be cut off and will begin again when the next trunk in the row is engaged by the hood. While the switches 26 and the electrical circuit of FIG. 5 may be utilized to automatically control the flow of liquid to nozzle 17, it will be understood that control of the liquid flow might be accomplished by utilization of a simple manual valve (not shown). To complete a 360° deposit of liquid around Each tree trunk in the row, the platform 29, after its initial pass down one side of the row of trees, is turned around the end of the row and is moved through a second pass down the other side of the tree row. Where an irregular row of bushes 51 (FIG. 4) is to have the closely adjacent, marginal area 52 sprayed, the platform 29 is moved, on its initial pass, in the direction of arrow 53 in FIG.4 and, on its second pass, in the direction of arrow 54 on the opposite side of the bush row.

The ground area sprayed in this fashion receives the sprayed liquid closely adjacent to the bush foliage (or the tree trunk in orchard applications) yet the sprayed liquid does not reach the bush foliage ortree trunk. Economical, non-selective herbicides can thus safely be used for weed control.

The for of the apparatus shown in FIG. 6 in similar to that so far described but is adapted for hand-held or backpack spraying. The hood 61, its resilient rim member and enclosed spray nozzle are all identical to those previously described. Sensing switches on the hood are not utilized in this form of the apparatus, the control of spray liquid flow being accomplished by means of a thumb-operated valve 62. The nozzle is carried by a boom portion 63*a* comparable to member 11*a* of FIG. 1, which telescopes into the member 63*b*, a compression spring 64 holding the members in extended position. The remaining portion 66 of the boom extends upwardly and terminates in a handle 67. The liquid tube 68, communicating with the spray nozzle, extends through the handle 67 and the conventional thumboperated valve is interposed in this spray liquid line. The line extends to the backpack of the operator where the pressurized liquid reservoir is conventionally carried. In operating this apparatus the user maintains frictional pressure between the resilient hood rim and the adjacent bush or tree trunk as he walks in the desired spraying path using valve 62 to control the flow of the spray liquid.

While the invention has been illustrated and described, in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A boom type spraying apparatus adapted to be moved parallel to a row of vegetation and to deposit a sprayed liquid on a targeted area adjacent the row while preventing the sprayed liquid from reaching the vegetation itself, said apparatus comprising a boom arm having telescoping portions permitting variation in the length of the boom but resiliently biased to maximum length position, means for supporting and moving the boom at one of its ends and a spray nozzle carried at the other end of the boom, a bell-shaped hood carried by the boom encircling said spray nozzle and free to rotate about its central axis with relation to the boom and nozzle, the outer marginal area of the hood being adapted to engage the vegetation and rotate about its central axis as the boom is moved along the row of vegetation with variations in the length of the boom accomodating irregularities in the contour of the vegetation row, said outer marginal area of the hood being provided with sensing means operable to control the flow of liquid to the nozzle to permit deposit of the sprayed liquid only when said hood engages the vegetation.

2. A boom type spraying apparatus as claimed in claim 1 in which said sensing means comprise electric switches disposed at spaced intervals around the hood periphery adapted to be actuated when adjacent portions of said hood periphery engage the row of vegetation, and an electrically operated valve opened by actuation of said switches controlling the flow of spray liquid to said nozzle.

* * * * *